US012800531B2

(12) United States Patent
Haneda et al.

(10) Patent No.: US 12,800,531 B2
(45) Date of Patent: Nov. 17, 2026

(54) IMPEDANCE MEASURING DEVICE AND METHOD

(71) Applicant: HIOKI E.E. CORPORATION, Nagano (JP)

(72) Inventors: Kazuaki Haneda, Nagano (JP); Tomohiro Yokoyama, Nagano (JP)

(73) Assignee: HIOKI E.E. CORPORATION, Nagano (JP)

( * ) Notice: Subject to any disclaimer, the term of this patent is extended or adjusted under 35 U.S.C. 154(b) by 161 days.

(21) Appl. No.: 18/729,682

(22) PCT Filed: Oct. 26, 2022

(86) PCT No.: PCT/JP2022/039989
§ 371 (c)(1),
(2) Date: Jul. 17, 2024

(87) PCT Pub. No.: WO2023/139870
PCT Pub. Date: Jul. 27, 2023

(65) Prior Publication Data

US 2025/0093286 A1 Mar. 20, 2025

(30) Foreign Application Priority Data

Jan. 21, 2022 (JP) ................................ 2022-008111

(51) Int. Cl.
*G01N 27/02* (2006.01)

(52) U.S. Cl.
CPC .................................. *G01N 27/02* (2013.01)

(58) Field of Classification Search
CPC ........ G01R 27/14; G01R 27/08; G01R 27/32; G01R 23/02; G01N 27/02
See application file for complete search history.

(56) References Cited

U.S. PATENT DOCUMENTS 6,054,867 A 4/2000 Wakamatsu
6,674,295 B1 * 1/2004 Kamitani .............. G01R 27/14
324/691

(Continued)

FOREIGN PATENT DOCUMENTS

JP 2001-074793 A 3/2001
JP 2007-033286 A 2/2007

(Continued)

OTHER PUBLICATIONS

International Search Report for corresponding International Application No. PCT/JP2022/039989 mailed Dec. 13, 2022.

(Continued)

*Primary Examiner* — Jermele M Hollington
*Assistant Examiner* — Demetrius R Pretlow
(74) *Attorney, Agent, or Firm* — Chrisman Gallo Tochtrop LLC

(57) ABSTRACT

An impedance measuring device capable of reducing influence of noise near a measurement frequency, and performing highly accurate measurement is provided. The problem can be solved by an impedance measuring device or the like, including: a signal generation unit that generates a first reference signal, and a second reference signal that is obtained by inverting a phase of the first reference signal at an interval of a predetermined inversion period; a measurement signal supply unit that produces a measurement signal based on the second reference signal, and supplies the measurement signal to a measurement object; a measuring unit that synchronously detects a signal occurring in the measurement object due to the measurement signal, using a modulation signal produced based on the first reference signal, and further produces a filtered signal by low-pass filtering the detected signal; and an arithmetic unit that determines impedance of the measurement object, based on (Continued)

an added average of a magnitude of the filtered signal when the first reference signal and the second reference signal are in phase, and a magnitude of the filtered signal with inverted sign when the first reference signal and the second reference signal are in anti-phase.

6 Claims, 8 Drawing Sheets

(56) References Cited

U.S. PATENT DOCUMENTS

| | | | | |
|---|---|---|---|---|
| 11,737,678 | B2 * | 8/2023 | Chetham .............. | A61B 5/0022 600/508 |
| 2004/0041625 | A1 | 3/2004 | Huber | |
| 2007/0024310 | A1 | 2/2007 | Tokuno et al. | |
| 2014/0009178 | A1 * | 1/2014 | Bai ........................ | G01R 27/02 324/713 |

FOREIGN PATENT DOCUMENTS

| | | | |
|---|---|---|---|
| JP | 3930586 | B2 | 6/2007 |
| JP | 2011-038969 | A | 2/2011 |
| JP | 2015-014469 | A | 1/2015 |
| JP | 5940389 | B2 | 6/2016 |
| JP | 2017-058176 | A | 3/2017 |
| JP | 2018-036205 | A | 3/2018 |
| WO | 2020/079888 | A1 | 4/2020 |

OTHER PUBLICATIONS

Written Opinion for corresponding International Application No. PCT/JP2022/039989 dated Dec. 13, 2022 and English translation.

Extended European Search report dated Dec. 18, 2025 for corresponding European Application No. 22922022.3.

Office Action in the corresponding KR application No. 10-2024-7025746 May 12, 2026.

* cited by examiner

IMPEDANCE MEASURING DEVICE AND METHOD

CROSS-REFERENCE TO RELATED APPLICATIONS

This application is a national stage entry of International Application No. PCT/JP2022/039989 filed on Oct. 26, 2022, which claims the benefit of priority to Japanese Application No. JP2022-008111, filed Jan. 21, 2022, the entire disclosures of which are hereby incorporated herein by reference.

TECHNICAL FIELD

The present invention relates to an impedance measuring device and method, and relates to a 4-terminal impedance measuring device and method using synchronous detection.

BACKGROUND ART

As a device for measuring internal impedance of an object to be measured, there is a 4-terminal impedance measuring device. The 4-terminal impedance measuring device supplies an AC measurement signal from a current source to a measurement object, detects a signal occurring in the measurement object due to the measurement signal, and determines the internal impedance of the measurement object from the current flowing through the measurement object, and the voltage between both terminals of the measurement object.

At this time, in order to accurately extract a measurement frequency component contained in the detection signal, synchronous detection as described in Patent Literature 1 may be used. For a 4-terminal impedance measurement using synchronous detection, first, the detection signal occurring in the measurement object due to the measurement signal is detected using two modulation signals having the same frequency as the measurement signal, and a phase difference of 90 degrees. Then, since the measurement frequency component contained in the detection signal is converted into direct current, a detected signal detected using the modulation signal having the same phase contains a DC component proportional to a resistance component of the measurement object. Moreover, a detected signal obtained by detecting the detection signal at a phase orthogonal to the measurement signal contains a DC component proportional to a reactance component of the measurement object. The internal impedance of the measurement object can be found by filtering each of the detected signals with a low pass filter (LPF) to extract the DC components, measuring the magnitudes of the DC components, and performing numerical processing.

DOCUMENT LIST

Patent Literature

Patent Literature 1: Japanese Patent No. 5940389

SUMMARY OF INVENTION

Technical Problem

There is a problem such that since the detected signal contains a frequency component of the difference between the frequency of the detection signal and the frequency of the measurement signal, the closer the frequency of noise contained in the detection signal is to the measurement frequency, the lower the modulation frequency becomes, and the more difficult it becomes to eliminate noise by the LPF. For example, when performing impedance measurements in parallel using a plurality of impedance measuring devices, mutual interference occurs between the measuring devices, but, when there is no lower limit to the difference between an own measurement frequency and an external noise frequency due to the measurement frequency of another measuring device, it is practically impossible to eliminate influence of interference by the LPF.

In order to reduce the influence of interference, it is considered to synchronize the measurement signals of the plurality of measuring devices. However, it is necessary to perform accurate communication between the measuring devices for synchronization, hardware and software of the measuring devices are complicated, and furthermore an inspection system incorporating the measuring devices has an issue with increased wiring.

It is also possible to consider a method that compensates for the influence of interference by signal processing and the like. However, since the amount of the influence of interference varies depending on the state of magnetic coupling due to the shape of a loop made by a measurement cable and the positional relationship with surrounding metal, and the state of the measurement signal of the interfering counterpart, it is not easy to always keep a constant amount of the influence, and it is very difficult to make highly accurate compensation.

The present invention has been made in consideration of the above problems, and the purpose of the present invention is to reduce the influence of noise near the measurement frequency, and enable highly accurate impedance measurement.

Solution to Problem

The problems can be solved by an impedance measuring device including: a signal generation unit that generates a first reference signal, and a second reference signal that is obtained by inverting a phase of the first reference signal at an interval of a predetermined inversion period; a measurement signal supply unit that produces a measurement signal, based on the second reference signal, and supplies the measurement signal to a measurement object; a measuring unit that synchronously detects a signal occurring in the measurement object due to the measurement signal, using a modulation signal produced based on the first reference signal, and further produces a filtered signal by low-pass filtering the detected signal; and an arithmetic unit that determines impedance of the measurement object, based on an added average of a magnitude of the filtered signal when the first reference signal and the second reference signal are in phase, and a magnitude of the filtered signal with inverted sign when the first reference signal and the second reference signal are in anti-phase.

In other words, when the measurement signal that is inverted at an interval of the inversion period is synchronously detected with the modulation signal that is not inverted, a signal component (original measurement signal component) occurring in the measurement object due to the measurement signal is inverted at an interval of the inversion period, and a noise component is not inverted. When the sign of this filtered signal is inverted, the original measurement signal component is not inverted at an interval of the inversion period, and only the noise component is inverted. Therefore, by taking an added average before and after the inversion at an interval of the inversion period, a noise signal can be canceled out. Moreover, by determining impedance of the measurement object, based on the magnitude of the filtered signal after the cancellation of the noise signal, it is possible to perform highly accurate impedance measurement while reducing the influence of noise near the measurement frequency. Note that the "added average" in the present application includes both meanings of: adding the magnitudes of the signals and taking an average (magnitude average); and adding an average of the magnitudes over a predetermined time period and taking an average (magnitude and temporal average). Further, "synchronous detection" means detecting a detection signal occurring in the measurement object due to the measurement signal, using two modulation signals having the same frequency as the measurement signal, and a phase difference of 90 degrees.

Furthermore, the problems can also be solved by an impedance measuring device including: a signal generation unit that generates a first reference signal, and a second reference signal that is obtained by inverting a phase of the first reference signal at an interval of a predetermined inversion period; a measurement signal supply unit that produces a measurement signal, based on the second reference signal, and supplies the measurement signal to a measurement object; a measuring unit that synchronously detects a signal occurring in the measurement object due to the measurement signal, using a modulation signal produced based on the second reference signal, and further produces a filtered signal by low-pass filtering the detected signal; and an arithmetic unit that determines impedance of the measurement object, based on an added average of a magnitude of the filtered signal when the first reference signal and the second reference signal are in phase, and a magnitude of the filtered signal when the first reference signal and the second reference signal are in anti-phase.

In other words, when the measurement signal that is inverted at an interval of the inversion period is synchronously detected with the modulation signal that is inverted at an interval of the inversion period, the original measurement signal component is not inverted, and only the noise component is inverted at an interval of the inversion period. Therefore, by taking an added average before and after the inversion of the phase, the noise signal can be canceled out. Then, by determining the impedance of the measurement object, based on the magnitude of the filtered signal after the cancellation of the noise signal, it is possible to perform highly accurate impedance measurement while reducing the influence of noise near the measurement frequency.

Here, it is desirable that the inversion period be an integral multiple of the period of the measurement signal to be supplied to the measurement object, and that the arithmetic unit determines the impedance of the measurement object, based on an added average over a measurement time period that is an integral multiple of the inversion period. By taking the temporal average of the measurement signal in each unit period, it is possible to further reduce noise signals with frequencies close to the measurement frequency.

Furthermore, the problems can also be solved by a method for implementing the respective functions of the signal generation unit, the measurement signal supply unit, the measuring unit, and the arithmetic unit.

Effects of Invention

According to the impedance measuring device of the present invention, it is possible to reduce the influence of noise near the measurement frequency, and perform highly accurate impedance measurement.

DESCRIPTION OF EMBODIMENTS

Figure 1:
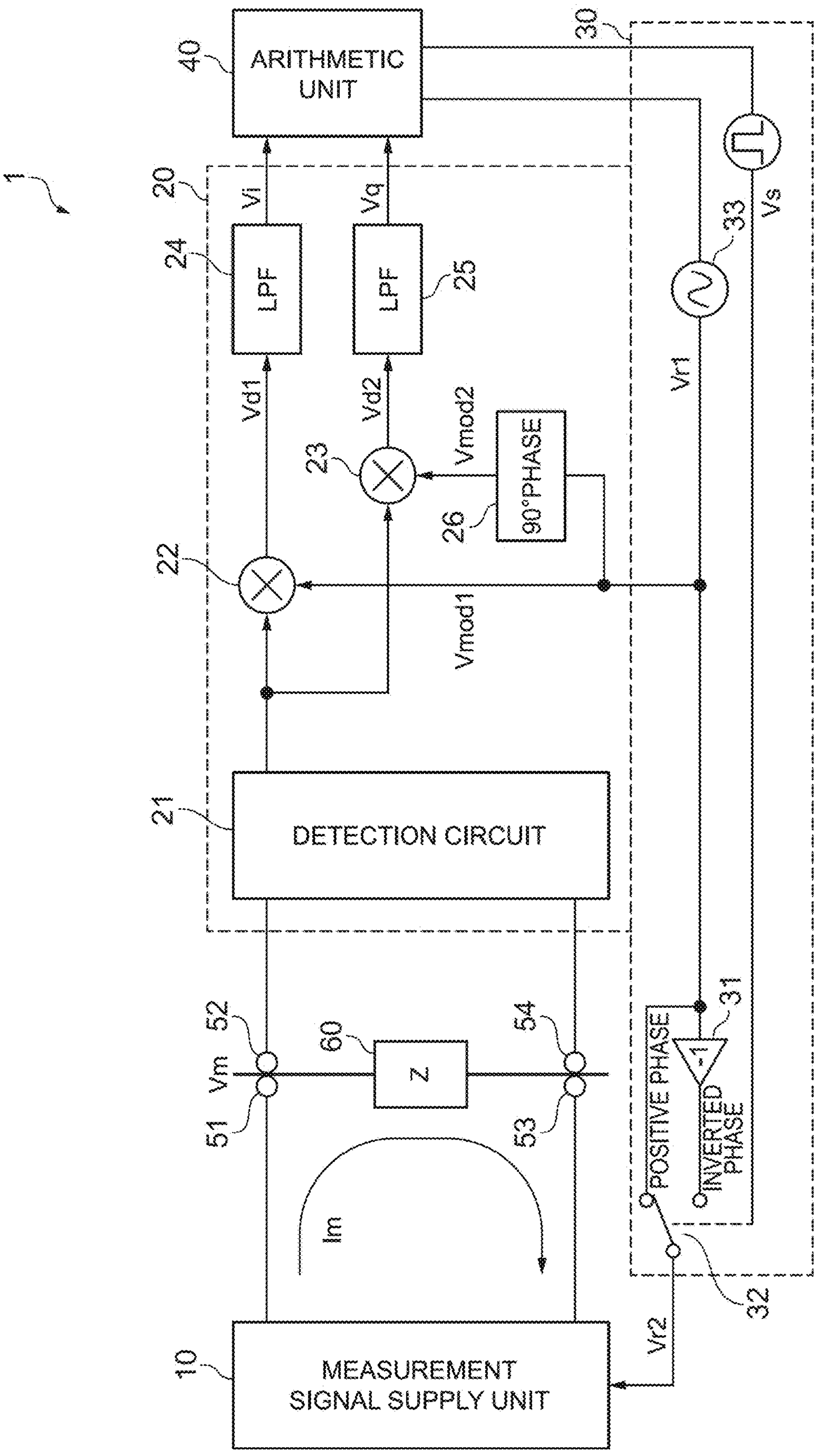
FIG. 1 A schematic configuration diagram illustrating a state in which an impedance measuring device 1 according to an embodiment of the present invention is connected to a measurement object.

Hereinafter, specific examples of embodiments of the present invention will be described with reference to the drawings. FIG. 1 is a schematic configuration diagram illustrating a state in which an impedance measuring device 1 as an example of an embodiment of the present invention is connected to a measurement object 60. Examples of such an impedance measuring device include a battery tester for measuring storage batteries, an LCR meter for measuring passive components such as coils, capacitors and resistors, and a C meter exclusively for capacitors.

The impedance measuring device 1 includes a measurement signal supply unit 10, a measuring unit 20, a signal generation unit 30, and an arithmetic unit 40. The impedance measuring device 1 supplies a measurement signal Im for measurement from the measurement signal supply unit 10 to the measurement object 60 through contact terminals 51, 53 contacting both terminals, respectively, of the measurement object 60, detects a signal Vm occurring between contact terminals 52, 54 contacting both terminals, respectively, of the measurement object 60 due to the measurement signal Im in the measuring unit 20, and determines internal impedance Z of the measurement object 60 and a phase angle θ, based on the magnitude of the measurement signal Im supplied to the measurement object 60 and the magnitude of the detection signal Vm, in the arithmetic unit 40. A reference signal Vr2 serving as a reference for the measurement signal Im, and a reference signal Vr1 serving as a reference for modulation signals Vmod1, Vmod2 for detecting the detection signal Vm are generated in the signal generation unit 30.

The measurement signal supply unit 10 is connected to the signal generation unit 30 and the contact terminals 51, 53, and has a signal source that produces the measurement signal Im that is in phase with the reference signal Vr2 input from the signal generation unit 30. The produced measurement signal Im is supplied through the contact terminals 51, 53 to the measurement object 60 connected to the contact terminals 51, 53.

The measuring unit 20 is connected to the signal generation unit 30, the arithmetic unit 40, and the contact terminals 52, 54, and includes a detection circuit 21, a 90-degree phase shifter 26, two low-pass filters (LPFs) 24, 25, and two multipliers 22, 23.

The detection circuit 21 has inputs connected to the contact terminals 52, 54, and outputs connected to the multipliers 22, 23. The detection circuit 21 detects a signal generated between the contact terminals 52, 54 contacting both terminals, respectively, of the measurement object 60 due to the measurement signal Im, and outputs the detection signal Vm.

The 90-degree phase shifter 26 has an input connected to the signal generation unit 30, and an output connected to the multiplier 23. The 90-degree phase shifter 26 produces the modulation signal Vmod2 by shifting the phase of the reference signal Vr1 received from the signal generation unit 30 by 90 degrees.

The multiplier 22 has inputs connected to the detection circuit 21 and the signal generation unit 30, and an output connected to the LPF 24. The multiplier 22 detects the detection signal Vm received from the detection circuit 21, with the modulation signal Vmod1 that is in phase with the reference signal Vr1 received from the signal generation unit 30, and outputs a detected signal Vd1. The multiplier 23 has inputs connected to the detection circuit 21 and the 90-degree phase shifter 26, and an output connected to the LPF 25. The multiplier 23 detects the detection signal Vm received from the detection circuit 21, with the modulation signal Vmod2 that is received from the 90-degree phase shifter 26 and is orthogonal in phase to the reference signal Vr1, and outputs a detected signal Vd2.

The LPFs 24, 25 have inputs connected to the multipliers 22, 23, respectively, and have outputs connected to the arithmetic unit 40. The LPF 24 produces a filtered signal Vi by low-pass filtering the detected signal Vd1 output from the multiplier 22 and extracting a DC component. The LPF 25 produces a filtered signal Vq by low-pass filtering the detected signal Vd2 output from the multiplier 23 and extracting a DC component.

The signal generation unit 30 has an input connected to the arithmetic unit 40, and outputs connected to the measurement signal supply unit 10 and the measuring unit 20, and includes a reference signal generator 33, a phase inverter 31, and a switch 32.

The reference signal generator 33 has an input connected to the arithmetic unit 40, and outputs connected to the phase inverter 31, the switch 32, and the multiplier 22 and the 90-degree phase shifter 26 of the measuring unit 20. The reference signal generator 33 generates the reference signal Vr1 having a period and a phase angle designated by a control signal from the arithmetic unit 40.

The phase inverter 31 has an input connected to the reference signal generator 33, and an output connected to the switch 32. The phase inverter 31 produces a reference signal by shifting (inverting) the phase of the reference signal Vr1 received from the reference signal generator 33 by 180 degrees.

The switch 32 is connected to the reference signal generator 33 at one end of an input, is connected to the phase inverter 31 at another end, is connected to the arithmetic unit 40 at a control terminal, and is connected to the measurement signal supply unit 10 at an output. Based on a control signal Vs produced in the arithmetic unit 40, the switch 32 selects a signal that is in phase (positive phase) with the reference signal Vr1, or a signal having inverted phase with respect to the reference signal Vr1 produced by the phase inverter 31, and outputs the selected signal as the reference signal Vr2.

The arithmetic unit 40 records, in a memory, the magnitudes of the filtered signals Vi, Vq input from the measuring unit 20. Moreover, the internal impedance Z of the measurement object 60 and the phase angle θ are found, based on the added average of the magnitudes of the filtered signals Vi, Vq (positive-phase filtered signals) when the reference signals Vr1, Vr2 have positive phase and the magnitudes of the filtered signals Vi, Vq (inverted-phase filtered signals) with inverted sign when the reference signals Vr1, Vr2 are in anti-phase. Further, the arithmetic unit 40 produces a signal for controlling the period and phase angle of the reference signal Vr1 generated by the reference signal generator 33, and the control signal Vs for switching the switch 32 at an interval of a predetermined inversion period T.

The inversion period T is set to be an integer multiple of the period of the reference signal Vr1 (i.e., the period of the measurement signal). Consequently, it is possible to obtain the magnitudes of the positive-phase filtered signal and inverted-phase filtered signal corresponding to each phase of the reference signal Vr1. A measurement time period is also set to be an integer multiple of the inversion period T. Furthermore, when the measurement time period is set to an even multiple of the inversion period T, the measurement time period for obtaining the magnitude of the positive-phase filtered signal and the measurement time period for obtaining the magnitude of the inverted-phase filtered signal can be made equal to each other.

Note that, in the impedance measuring device 1 of the present example, the multipliers 22, 23, the LPFs 24, 25 and the 90-degree phase shifter 26 of the measuring unit 20, and the arithmetic unit 40 are configured by a computer including a processor and a memory. In other words, programs including instructions that realize the respective elements of the measuring unit 20 and the respective functions of the arithmetic unit 40 when the programs are executed by the processor are stored in the memory, and the elements of the measuring unit 20 and the functions of the arithmetic unit 40 are realized as the processor executes the programs. Note that some or all of each of the elements of the measuring unit 20 and the arithmetic unit 40 may be realized by hardware such as electronic circuits and devices. The description of the connection relationships between the elements of the impedance measuring device 1 means electrical and mechanical connections for the hardware configuration, and a flow of processing for the software configuration.

Figure 2:
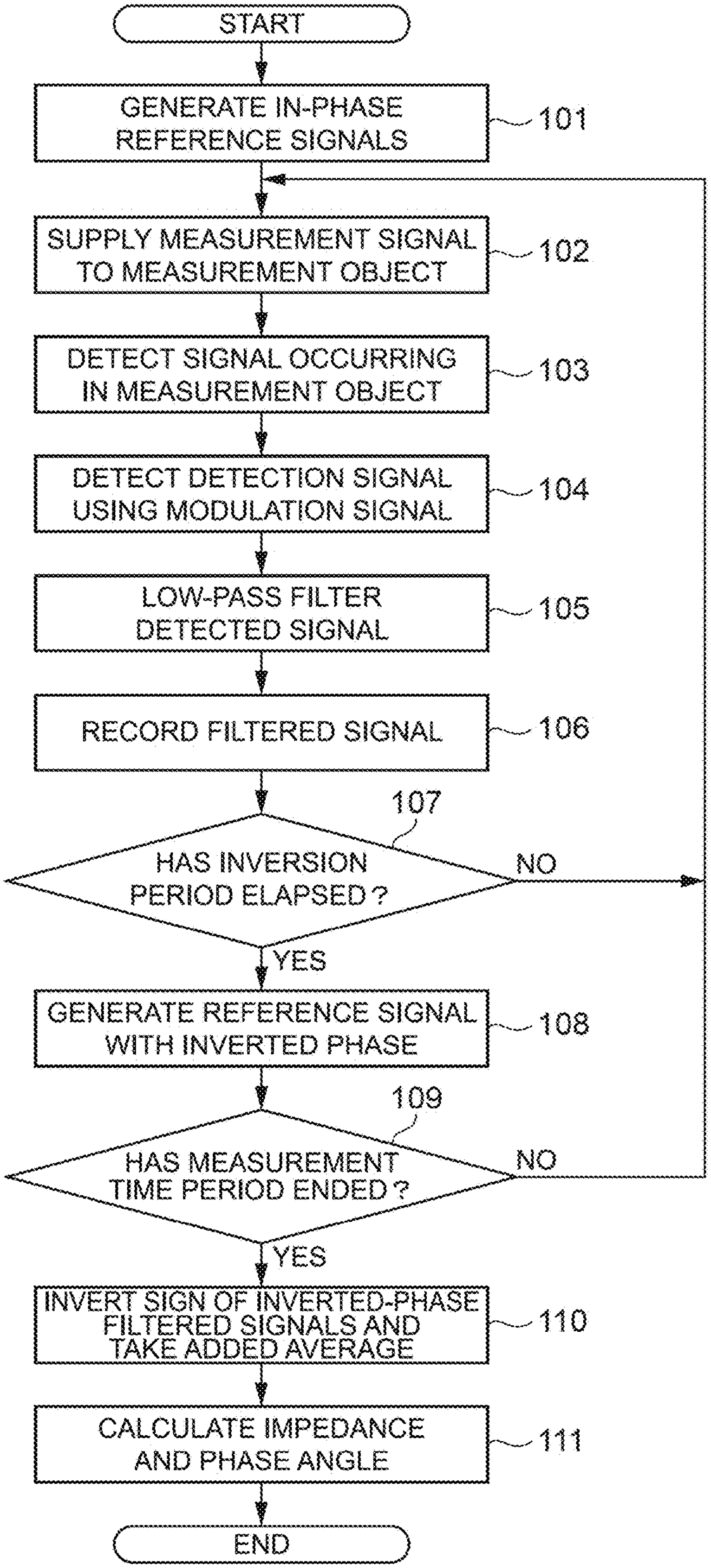
FIG. 2 An operation flowchart of the impedance measuring device 1 according to the embodiment of the present invention.

Next, an operation of the impedance measuring device 1 of the present example, that is, one example of embodiments of an impedance measuring method of the present invention, will be described with reference to the flowchart in FIG. 2.

First, the signal generation unit 30 generates in-phase reference signals Vr1, Vr2 (step 101). More specifically, based on the control signal from the arithmetic unit 40, the reference signal generator 33 generates the reference signal Vr1=sin 2πft (t is time) with frequency f, and the switch 32 selectively outputs a positive-phase input. As a result, the reference signal Vr2=sin 2πft that is in phase with the reference signal Vr1 is output from the switch 32.

Thereafter, the measurement signal supply unit 10 produces the measurement signal Im=I sin 2πft that is in phase with the reference signal Vr2 received from the signal generation unit 30, and supplies the measurement signal Im to the measurement object 60 (step 102). A voltage corresponding to the impedance Z of the measurement object 60 and phase angle θ is generated between both terminals of the measurement object 60 due to the measurement signal Im. The detection circuit 21 detects the detection signal Vm=ZI sin(2πft+θ) occurring between the contact terminals 52, 54 contacting both terminals, respectively, of the measurement object 60 (step 103).

Thereafter, when the multiplier 22 modulates the detection signal Vm with a modulation signal Vmod1=sin 2πft that is in phase with the reference signal Vr1, the detected signal Vd1 produced by superimposing a DC component corresponding to a resistance component R=Z cos θ of the impedance Z of the measurement object 60 and an AC component of frequency 2f is obtained (step 104) as shown in Equation (1).

Equation 1

Moreover, when the multiplier 23 modulates the detection signal Vm with the modulation signal Vmod2=cos 2πft that is produced by the 90-degree phase shifter 26 and has a phase difference of 90 degrees with respect to the reference signal Vr1, the detected signal Vd2 produced by superimposing a DC component corresponding to a reactance component X=Z sin θ of the impedance Z of the measurement object 60 and the AC component of frequency 2f is obtained (step 104) as shown in Equation (2).

Equation 2

Thereafter, the detected signals Vd1, Vd2 are low-pass filtered with the LPFs 24, 25 to extract the DC components and produce filtered signals Vi, Vq (step 105) as shown in Equation (3). Thereafter, the arithmetic unit 40 stores the magnitudes of the produced filtered signals Vi, Vq together with the detection time in the memory (step 106).

Equation 3

When there is no noise from outside of the impedance measuring device 1, the impedance Z (R and X) of the measurement object 60 and the phase angle θ can be found from instantaneous values of the voltages of the filtered signals Vi, Vq. Note that, even when the value of the measurement signal Im is not known, if the amplitude and phase of the measurement signal are measured by a method using synchronous detection, it is possible to obtain the impedance Z (R and X) and the phase angle θ, based on the values of voltages and current.

Here, when the detection signal Vm contains external noise Vn sin(2πfnt+ϕ) with frequency fn, a detected signal of external noise Vn contains a component signal shown in Equation (4).

Equation 4

As is clear from the first term on the right side of Equation (4), the detected signal contains a frequency component of the difference between the frequency fn of the external noise and the frequency f of the modulation signal Vmod1. Like mutual interference that occurs between measuring devices when impedance measurements are performed in parallel using a plurality of impedance measuring devices, if the frequency fn of the external noise Vn is close to the modulation signal Vmod1, it is difficult to sufficiently eliminate the external noise Vn with the LPFs 24, 25, and the filtered signals contain the low-frequency component of the first term on the right-hand side of Equation (4). When the impedance Z (R and X) of the measurement object 60 and the phase angle θ are found from the measured values of such filtered signals Vi, Vq, the measurement error becomes larger. Therefore, in the impedance measuring device 1, by producing a low-frequency component having inverted phase with respect to the low-frequency component in the first term on the right-hand side of Equation (4) and taking the added average, the low-frequency component in the first term on the right-hand side is canceled out, and the influence of the external noise Vn is reduced.

Specifically, first, above-described operation from step 102 to step 106 is repeated, at an interval of a predetermined sampling period, over the inversion period T (step 107). It is desirable that the inversion period T be set to an integer multiple of the period of the reference signals Vr1, Vr2. Consequently, temporal changes in the voltages of the filtered signals Vi, Vq corresponding to each phase of the reference signal Vr1 can be recorded in the memory. In the impedance measuring device 1 of the present example, the inversion period T is set to twice the period of the reference signals Vr1, Vr2. The inversion period T can be suitably set to 10 periods, 100 periods, or the like of the reference signals Vr1, Vr2.

When the predetermined inversion period T has elapsed, the arithmetic unit 40 transmits the control signal Vs for switching the switch 32. Then, the switch 32 selectively outputs an inverted-phase input. As a result, the reference signal Vr2=−sin 2πft that is in anti-phase with the reference signal Vr1 is output from the switch 32 (step 108).

Thereafter, it is determined whether the predetermined measurement time period has ended (step 109). It is desirable that the measurement time period be set to an integer multiple of the inversion period T. In particular, in order to take the temporal added average of the magnitudes of the filtered signals Vi, Vq when the reference signals Vr1, Vr2 are in phase, and the magnitudes of the filtered signals Vi, Vq with inverted sign when the reference signals Vr1, Vr2 are in anti-phase, it is desirable to have a record of the magnitudes of the in-phase and inverted-phase filtered signals Vi, Vq with equal measurement time period, and therefore it is desirable that the measurement time period be set to an even multiple of the inversion period T. In the impedance measuring device 1 of the present example, the measurement time period is set to twice the inversion period T, and thus to a time period equivalent to four periods of the reference signals Vr1, Vr2.

At the time when a first execution of the processing in step 102 to step 108 has ended, only measurement for one period of the inversion period has been performed, and therefore the process returns to step S102, and the operation from step 102 to step 108 is repeated. Note that, in a second execution of the processing, two reference signals Vr1, Vr2 are in anti-phase.

Figure 3:
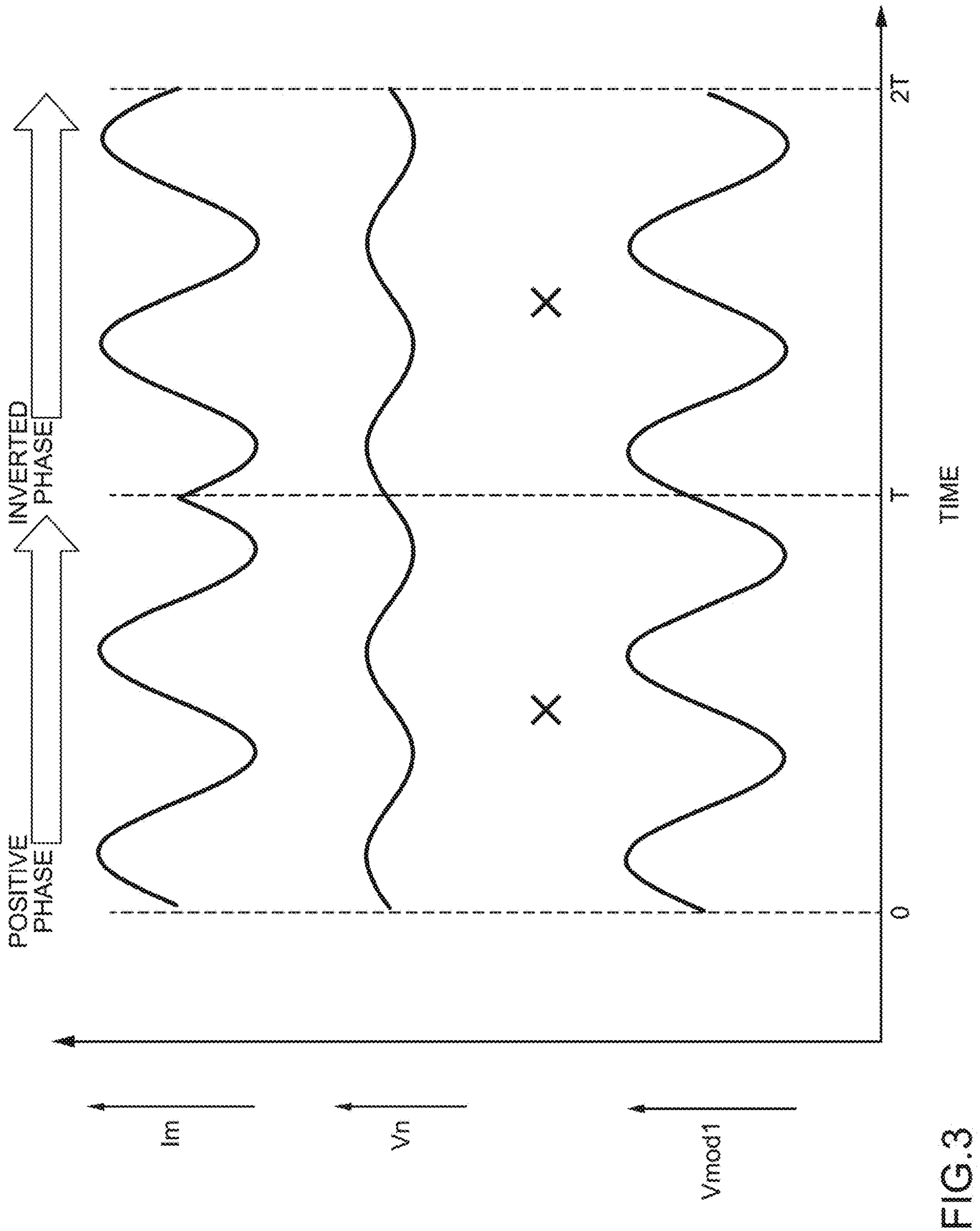
FIG. 3 An explanatory diagram illustrating a measurement signal to be supplied to the measurement object, external noise, and a reference signal in regard to the impedance measuring device 1.

FIG. 3 shows temporal changes in the measurement signal Im to be supplied to the measurement object 60, the external noise Vn, and the modulation signal Vmod1. The time from 0 to T corresponds to the first execution of the processing, and the time from T to 2T corresponds to the second execution of the processing. Since the modulation signal Vmod1 is a signal based on the reference signal Vr1, there is no phase change between the first execution of the processing and the second execution of the processing, whereas since the measurement signal Im is a signal based on the reference signal Vr2, the phase is inverted between the first execution of the processing and the second execution of the processing. Therefore, the component proportional to the impedance Z of the measurement object 60, which is contained in the filtered signals Vi, Vq, is inverted in phase between the first execution of the processing and the second execution of the processing. On the other hand, since the component due to the external noise Vn contained in the detected signal is not influenced by the phase of the measurement signal Im, the component has the same phase in the first execution of the processing and the second execution of the processing.

Equation 5

When the second execution of the processing of step 102 to step 108 has been completed, the measurement time that is twice the inversion period T has elapsed, and the measurement time period ends (step 109). As a result, the temporal changes in the voltages of the filtered signals Vi, Vq for two periods of the reference signal when the two reference signals Vr1, Vr2 are in phase, and the temporal changes in the voltages of the filtered signals Vi, Vq for two periods of the reference signal when the two reference signals Vr1, Vr2 are in anti-phase are recorded in the memory.

Thereafter, the processor of the arithmetic unit 40 reads the voltages of the filtered signals Vi, Vq from the memory, inverts the sign of the voltages of the filtered signals Vi, Vq when the two reference signals Vr1, Vr2 are in anti-phase, and takes the added average (step 110). By taking the added average of the magnitudes of the filtered signals Vi, Vq when the two reference signals Vr1, Vr2 are in phase and the magnitudes of the filtered signals Vi, Vq with inverted sign when the two reference signals Vr1, Vr2 are in anti-phase, the components corresponding to the first term on the right-hand side of Equations (4) and Equation (4') are canceled out, and it is possible to obtain the magnitudes of the filtered signals Vi, Vq with reduced influence of the external noise Vn.

Note that, in the impedance measuring device 1 of the present example, although the added average of the magnitudes of the filtered signals Vi, Vq over the entire measurement time period stored in the memory is calculated, one or more sets of in-phase filtered signals and anti-phase filtered signals when the reference signal Vr1 has the same phase during the measurement time period may be obtained, and the added average of each of the filtered signals Vi, Vq may be calculated. For example, the magnitudes of a total of four filtered signals constituted by the magnitudes of the filtered signals Vi, Vq when the phase of the reference signal Vr1 is π/4 in the first execution of the processing of step 102 to step 108, and the magnitudes of the filtered signals Vi, Vq when the phase of the reference signal Vr1 is π/4 in the second execution of the processing of step 102 to step 108 are obtained from the memory, and the added average of the magnitude of the filtered signal Vi in the first execution of the processing and the magnitude of the filtered signal Vi with the sign inverted in the second execution of the processing is taken to determine the magnitude of the filtered signal Vi with reduced influence of the external noise Vn. Moreover, the magnitude of the filtered signal Vq with reduced influence of the external noise Vn is found by taking the added average of the magnitude of the filtered signal Vq in the first execution of the processing and the magnitude of the filtered signal Vq with the sign inverted in the second execution of the processing.

As another example, a total of eight magnitudes of the filtered signals constituted by a first set including the magnitudes of the filtered signals Vi, Vq when the phase of the reference signal Vr1 in the first execution of the processing is π/4 and the magnitudes of the filtered signals Vi, Vq when the phase of the reference signal Vr1 in the second execution of the processing is π/4, and a second set including the magnitudes of the filtered signals Vi, Vq when the phase of the reference signal Vr1 in the first execution of the processing is π/2 and the magnitudes of the filtered signals Vi, Vq when the phase of the reference signal Vr1 in the second execution of the processing is π/2 are read from the memory. Only the sings of the filtered signals Vi, Vq in the second execution of the processing are inverted, and the added average (magnitude and temporal average) of the magnitudes of four filtered signals Vi included in the obtained magnitudes of the filtered signals is taken to determine the magnitude of the filtered signal Vi with reduced influence of the external noise Vn. Moreover, only the sings of the filtered signals Vi, Vq in the second execution of the processing are inverted, and the added average (magnitude and temporal average) of the magnitudes of four filtered signals Vq is taken to determine the magnitude of the filtered signal Vq with reduced influence of the external noise Vn.

Finally, the processor of the arithmetic unit 40 calculates the impedance Z (R and X) of the measurement object 60 and the phase angle θ from the added average found in step 110, i.e., the magnitudes of the filtered signals Vi, Vq after canceling the external noise Vn (step 111).

Figure 4:
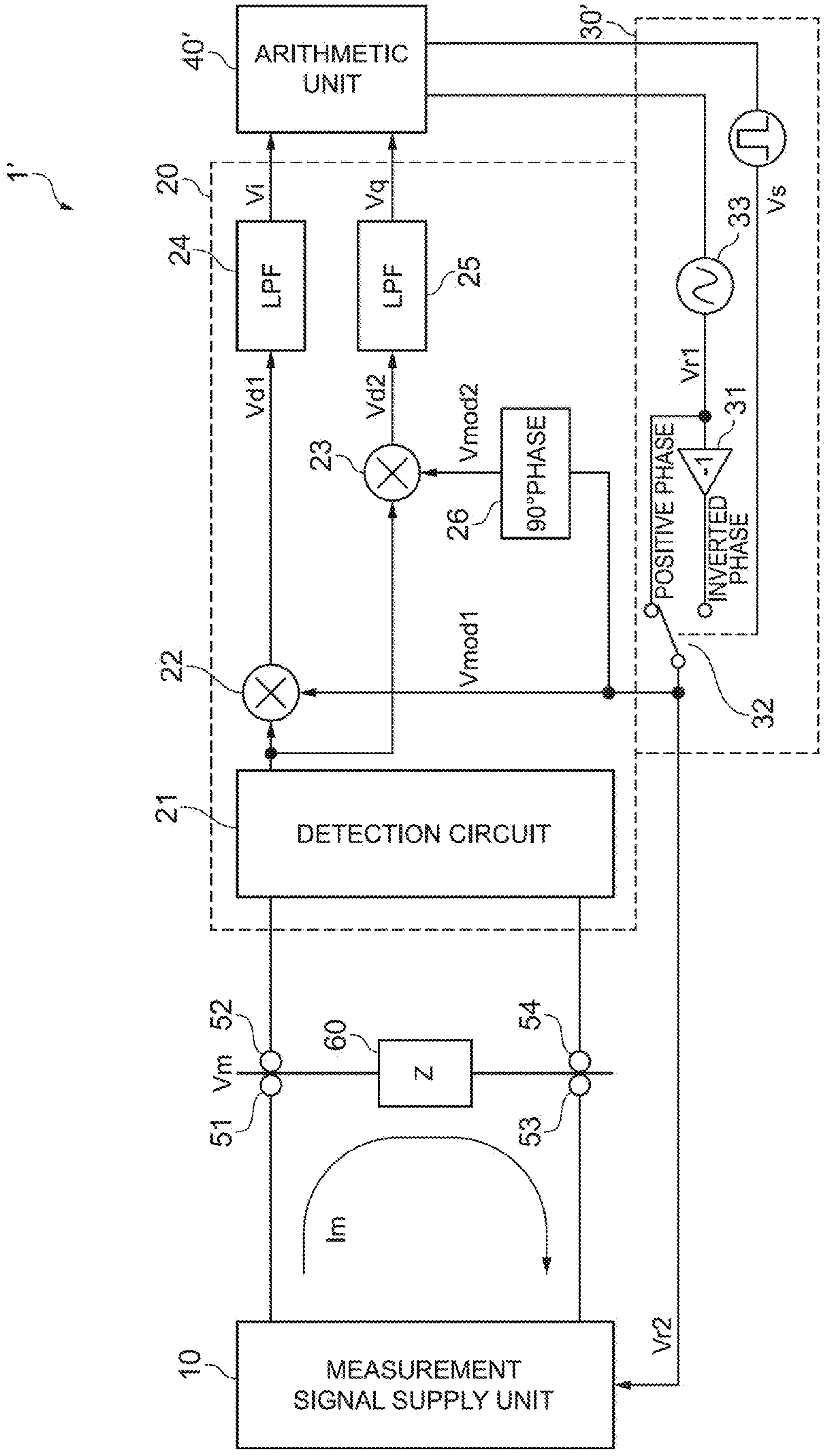
FIG. 4 A schematic configuration diagram illustrating a state in which an impedance measuring device 1'according to an embodiment of the present invention is connected to the measurement object.
Figure 5:
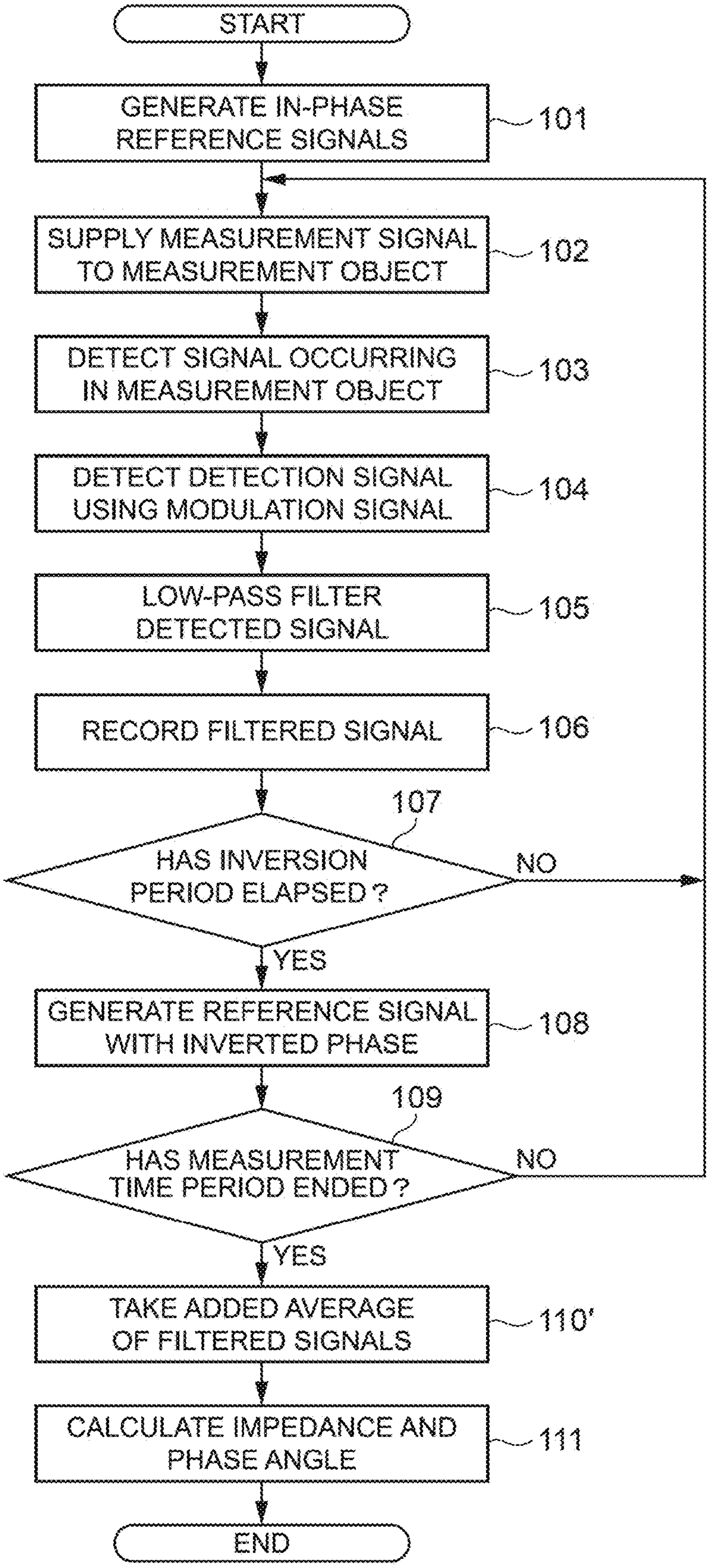
FIG. 5 An operation flowchart of the impedance measuring device 1' according to the embodiment of the present invention.

FIG. 4 and FIG. 5 show a schematic configuration diagram illustrating a state in which an impedance measuring device l' as another embodiment of the present invention is connected to the measurement object 60, and an operation flowchart. Although the impedance measuring device 1' differs from the impedance measuring device 1 in regard to the positions of the phase inverter 31 and the switch 32 of a signal generation unit 30', and the operation of an arithmetic unit 40' in step 110 in FIG. 2, other configurations are the same as those of the impedance measuring device 1. Therefore, configurations and operations showing the same functions and operations as those of the impedance measuring device 1 are given the same reference signs, and descriptions thereof are omitted.

The signal generation unit 30' has an input connected to the arithmetic unit 40', and outputs connected to the measurement signal supply unit 10 and the measuring unit 20, and includes the reference signal generator 33, the phase inverter 31, and the switch 32.

The reference signal generator 33 has an input connected to the arithmetic unit 40', and an output connected to the phase inverter 31 and the switch 32. The reference signal generator 33 generates a reference signal Vr1 with a period and a phase angle designated by a control signal from the arithmetic unit 40'.

The phase inverter 31 has an input connected to the reference signal generator 33, and an output connected to the switch 32. The phase inverter 31 produces a reference signal by shifting (inverting) the phase of the reference signal Vr1 received from the reference signal generator 33 by 180 degrees.

The switch 32 is connected to the reference signal generator 33 at one end of the input, is connected to the phase inverter 31 at another end, and has a control terminal connected to the arithmetic unit 40', and has an output connected to the measurement signal supply unit 10, and to the multiplier 22 and the 90-degree phase shifter 26 of the measuring unit 20. Based on the control signal Vs produced in the arithmetic unit 40', the switch 32 selects a signal that is in phase (positive phase) with the reference signal Vr1, or a signal having inverted phase with respect to the reference signal Vr1 produced by the phase inverter 31, and outputs the selected signal as the reference signal Vr2.

The arithmetic unit 40' determines the magnitudes of the filtered signals Vi, Vq input from the measuring unit 20, and records the magnitudes in the memory. Moreover, the internal impedance Z of the measurement object 60 and the phase angle θ are found, based on the added average of the magnitudes of the filtered signals Vi, Vq (positive-phase filtered signals) when the reference signals Vr1, Vr2 have positive phase and the magnitudes of the filtered signals Vi, Vq (inverted-phase filtered signals) when the reference signals Vr1, Vr2 are in anti-phase. Further, the arithmetic unit 40' produces a signal for controlling the period and phase angle of the reference signal Vr1 that is generated by the reference signal generator 33, and a control signal Vs for switching the switch 32 at an interval of a predetermined inversion period T.

Note that, in the impedance measuring device 1' of the present example, the multipliers 22, 23, the LPFs 24, 25 and the 90-degree phase shifter 26 of the measuring unit 20, and the arithmetic unit 40' are configured by a computer including the processor and the memory. In other words, programs including instructions that realize the respective elements of the measuring unit 20 and the respective functions of the arithmetic unit 40' when the programs are executed by the processor are stored in the memory, and the elements of the measuring unit 20 and the functions of the arithmetic unit 40' are realized as the processor executes the programs. Note that some or all of each of the elements of the measuring unit 20 and the arithmetic unit 40' may be realized by hardware such as electronic circuits and devices. The description of the connection relationships between the elements of above-described impedance measuring device 1' means electrical and mechanical connections for the hardware configuration, and a flow of processing for the software configuration.

Next, an operation of the impedance measuring device 1' of the present example will be described with reference to the flowchart in FIG. 5.

First, the signal generation unit 30 generates the reference signals Vr1, Vr2 that are in phase (step 101). More specifically, based on the control signal from the arithmetic unit 40', the reference signal generator 33 generates the reference signal Vr1=sin 2πft (t is time) with frequency f, and the switch 32 selectively outputs a positive-phase input. As a result, the reference signal Vr2=sin 2πft that is in phase with the reference signal Vr1 is output from the switch 32.

Thereafter, the measurement signal supply unit 10 produces the measurement signal Im=I sin 2πft that is in phase with the reference signal Vr2 received from the signal generation unit 30', and supplies the measurement signal Im to the measurement object 60 (step 102). A voltage corresponding to the impedance Z of the measurement object 60 and the phase angle θ occurs between both terminals of the measurement object 60 due to the measurement signal Im. The detection circuit 21 detects the detection signal Vm=ZI sin(2πft+θ) generated between the contact terminals 52, 54 contacting both terminals, respectively, of the measurement object 60 (step S103).

Thereafter, when the multiplier 22 modulates the detection signal Vm with a modulation signal Vmod1=sin 2πft that is in phase with the reference signal Vr2, the detected signal Vd1 produced by superimposing the DC component corresponding to a resistance component R=Z cos θ of the impedance Z of the measurement object 60 and the AC component of frequency 2f is obtained (step 104).

Moreover, when the multiplier 23 modulates the detection signal Vm with a modulation signal Vmod2=cos 2πft that is produced by the 90-degree phase shifter 26 and has a phase difference of 90 degrees with respect to the reference signal Vr2, the detected signal Vd2 produced by superimposing the DC component corresponding to a reactance component X=Z cos θ of the impedance Z of the measurement object 60 and the AC component of frequency 2f is obtained (step 104).

Thereafter, the detected signals Vd1, Vd2 are low-pass filtered with the LPFs 24, 25 to extract the DC components and produce filtered signals Vi, Vq (step 105). Thereafter, the arithmetic unit 40' stores the magnitudes of the produced filtered signals Vi, Vq together with the detection time in the memory (step 106).

The operation from step 102 to step 106 described above is repeated, at an interval of a predetermined sampling period, over the inversion period T (step 107). In the impedance measuring device 1' of the present example, the inversion period T is also set to twice the period of the reference signals Vr1, Vr2.

When the predetermined inversion period T has elapsed, the arithmetic unit 40' transmits the control signal Vs for switching the switch 32. Then, the switch 32 selectively outputs an inverted-phase input. As a result, the reference signal Vr2=−sin 2πft that is in anti-phase with the reference signal Vr1 is output from the switch 32 (step 108).

Subsequently, it is determined whether the predetermined measurement time period has ended (step 109). In the impedance measuring device 1' of the present example, the measurement time period is also set to twice the inversion period T, and is thus set to a time period equivalent to four periods of the reference signals Vr1, Vr2.

At the time when the first execution of the processing in step 102 to step 108 has been completed, only measurement for one inversion period has been performed, and therefore the process returns to step S102, and the operation in step 102 to step 108 is repeated. Note that, in the second execution of the processing, two reference signals Vr1, Vr2 are in anti-phase.

Figure 6:
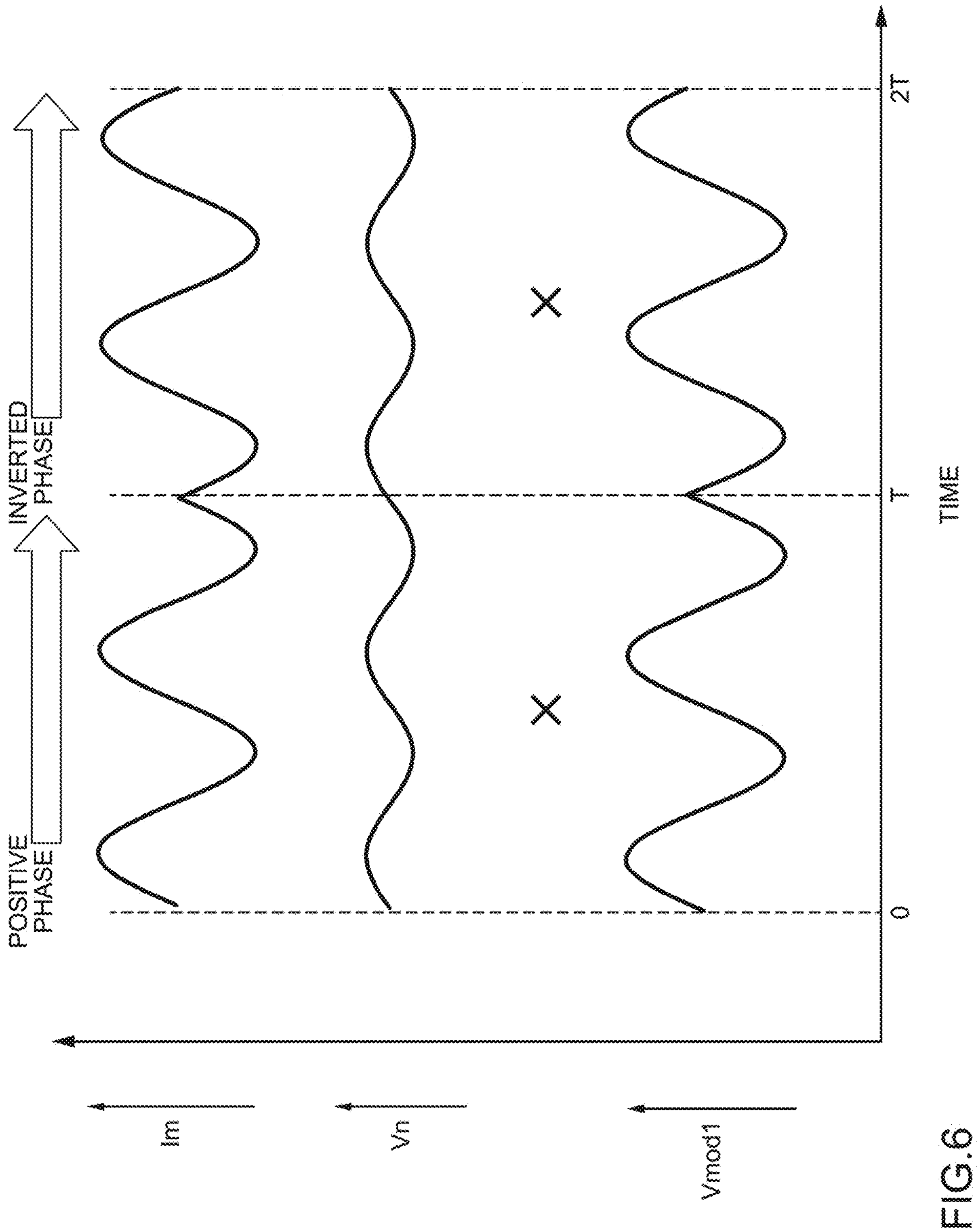
FIG. 6 An explanatory diagram illustrating a measurement signal to be supplied to the measurement object, external noise, and a reference signal in regard to the impedance measuring device 1'.

FIG. 6 shows temporal changes in the measurement signal Im to be supplied to the measurement object, the external noise Vn, and the modulation signal Vmod1. The time from 0 to T corresponds to the first execution of the processing, and the time from T to 2T corresponds to the second execution of the processing. Since both the measurement signal Im and the modulation signal Vmod1 are signals based on the reference signal Vr2, the phase is inverted between the first execution of the processing and the second execution of the processing, but, in the phase relationship between the measurement signal Im and the modulation signal Vmod1, the measurement signal Im and the modulation signal Vmod1 remain in phase with each other. Therefore, the components proportional to the impedance Z of the measurement object 60, which are contained in the filtered signals Vi, Vq, have the same phase between the first execution of the processing and the second execution of the processing. On the other hand, the component due to the external noise Vn contained in the detected signal has inverted phase because the phase of the modulation signal Vmod1 is inverted between the first execution of the processing and the second execution of the processing.

When the second execution of the processing in step 102 to step 108 has been completed, the measurement time that is twice the inversion period T has elapsed, and the measurement time period ends (step 109). As a result, in the memory, the temporal changes in the voltages of the filtered signals Vi, Vq for two periods of the reference signal when the two reference signals Vr1, Vr2 are in phase (both the measurement signal Im and the modulation signal Vmod1 have positive phase), and the temporal changes in the voltages of the filtered signals Vi, Vq for two periods of the reference signal when the two reference signals Vr1, Vr2 are in anti-phase (both the measurement signal Im and the modulation signal Vmod1 have inverted phase) are recorded.

Thereafter, the processor of the arithmetic unit 40' reads the voltages of the filtered signals Vi, Vq from the memory, and takes an added average of the filtered signals Vi, Vq (step 110'). The component due to the external noise Vn contained in the filtered signal is inverted in phase between when two reference signals Vr1, Vr2 have the same phase and when the two reference signals Vr1, Vr2 have inverted phase, and therefore the external noise Vn is canceled out by taking the added average of these signals, and it is possible to obtain the magnitudes of the filtered signals Vi, Vq with reduced influence of the external noise Vn.

Finally, the processor of the arithmetic unit 40' calculates the impedance Z (R and X) of the measurement object 60 and the phase angle θ from the added average found in step 110', i.e., the magnitudes of the filtered signals Vi, Vq after canceling the external noise Vn (step 111).

Figure 7:
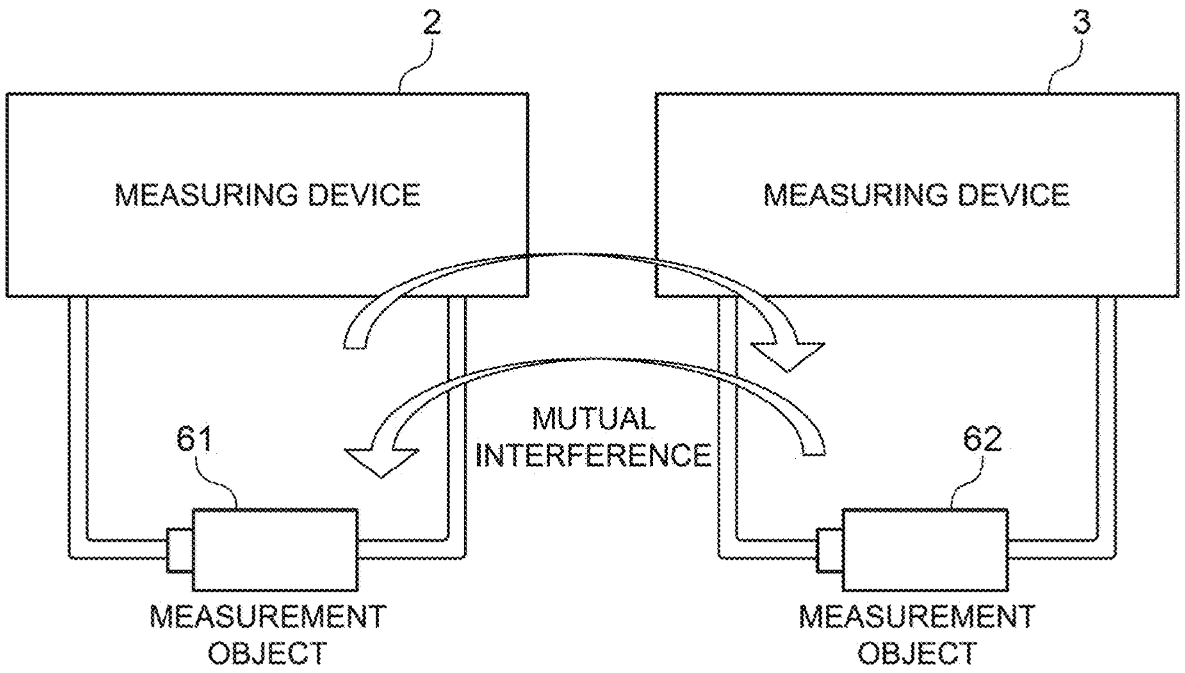
FIG. 7 A schematic configuration diagram of a plurality of impedance measurements.
Figure 8A:
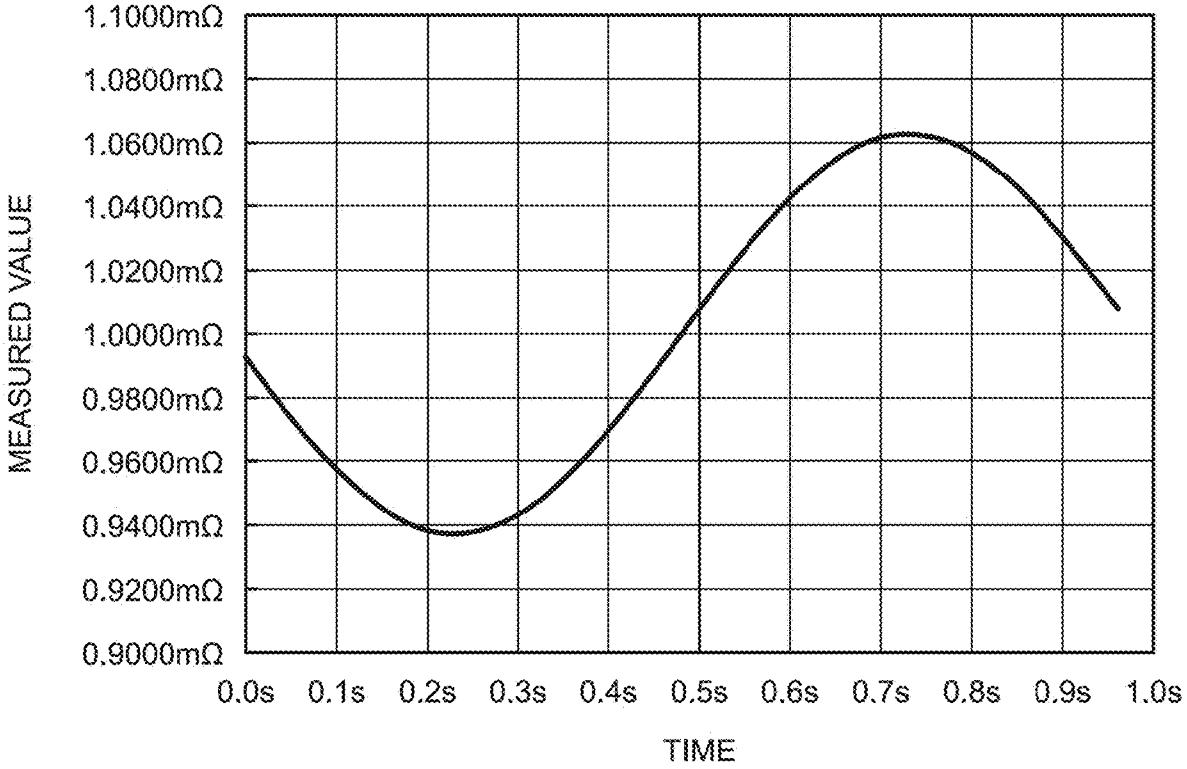
FIG. 8A The measurement results of the plurality of impedance measurements.
Figure 8B:
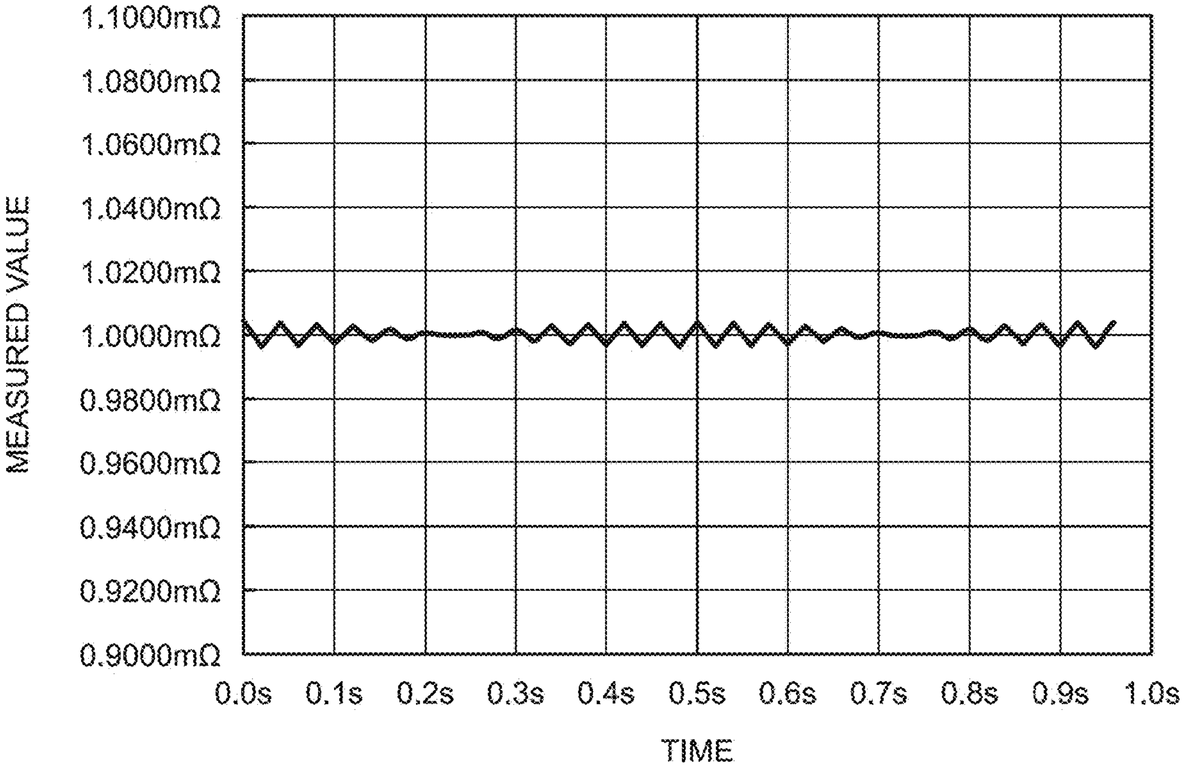
FIG. 8B The measurement results of the plurality of impedance measurements.

FIG. 7 shows a configuration when performing impedance measurements simultaneously in parallel using two impedance measuring devices described in the above embodiment, and FIG. 8A and FIG. 8B show simulation results of filtered signals. An impedance measuring device 2 measures the impedance Z of a measurement object 61 and the phase angle θ at a measurement frequency f of 1 kHz. An impedance measuring device 3 measures the impedance Z of a measurement object 62 and the phase angle θ at a measurement frequency f of 999 Hz. Since two impedance measuring devices 2, 3 are disposed close to each other, the respective devices interfere with each other. In other words, external noise due to the 999-Hz measurement signal Im of the impedance measuring device 3 is input into a detection circuit 21 of the impedance measuring device 2. Moreover, external noise due to the 1-kHz measurement signal Im of the impedance measuring device 2 is input into the detection circuit 21 of the impedance measuring device 3.

FIG. 8 shows the measurement results of the impedance measuring device 2 (1 kHz measurement frequency, 999 Hz external noise), wherein FIG. 8A shows the filtered signal before performing the added averaging process in step 110, and FIG. 8B shows the filtered signal after the added averaging process. In the filtered signal before the added averaging process, an AC component corresponding to a frequency difference of 1 Hz=1000 Hz−999 Hz between the reference signal and the external noise is superimposed on a DC component. On the other hand, it can be understood that, in the filtered signal after the added averaging process, the AC component has been reduced. Thus, it can be understood that the influence of the external noise Vn can be reduced by taking the added average of the filtered signals Vi, Vq when two reference signals Vr1, Vr2 are in phase, and the filtered signals Vi, Vq when the two reference signals Vr1, Vr2 are in anti-phase. By determining the impedance Z of the measurement object 61 and the phase angle θ, based on the magnitudes of the filtered signals with reduced external noise, it is possible to perform highly accurate impedance measurement while reducing the influence of noise near the measurement frequency.

The invention made by the inventors of the present application has been specifically described based on the embodiments, and it is needless to say that the present invention is not limited to the embodiments, and various modification may be made to the invention without departing from the spirit and scope of the invention. For example, in the impedance measuring devices 1, 1' described in above-described embodiments, although the signal generation unit 30 generates reference signals, based on the frequency and phase angle of the reference signals defined by the arithmetic units 40, 40', digital data of reference signal waveforms in which switching between positive phase and inverted phase occurs may be produced in the arithmetic unit 40, and the reference signals may be generated in the signal generation unit 30. Moreover, although the measurement signals Im of the impedance measuring device 1, 1' are in phase with the reference signal Vr2, and the modulation signal Vmod1 is in phase with reference signal Vr1 or Vr2, the same amount of phase offset with respect to the respective reference signals may be present. However, even when a phase offset is present, the measurement signal Im and the modulation signal Vmod1 must maintain the in-phase relationship or the anti-phase relationship.

LIST OF REFERENCE SIGNS

1, 1', 2, 3 impedance measuring device,
10 measurement signal supply unit,
20 measuring unit,
21 detection circuit,
22, 23 multiplier,
24, 25 low-pass filter (LPF),
26 90-degree phase shifter,
30, 30' signal generation unit,
31 phase inverter,
32 switch,
33 reference signal generator,
40, 40' arithmetic unit
51, 52, 53, 54 contact terminal, and
60, 61, 62 measurement object

The invention claimed is:

1. An impedance measuring device comprising:

a signal generation unit that generates a first reference signal, and a second reference signal that is obtained by inverting a phase of the first reference signal at an interval of a predetermined inversion period;

a measurement signal supply unit that produces a measurement signal, based on the second reference signal, and supplies the measurement signal to a measurement object;

a measuring unit that synchronously detects a signal occurring in the measurement object due to the measurement signal, using a modulation signal produced based on the first reference signal, and further produces a filtered signal by low-pass filtering the detected signal; and an arithmetic unit that determines impedance of the measurement object, based on an added average of a magnitude of the filtered signal when the first reference signal and the second reference signal are in phase, and a magnitude of the filtered signal with inverted sign when the first reference signal and the second reference signal are in anti-phase.

2. An impedance measuring device comprising:

a signal generation unit that generates a first reference signal, and a second reference signal that is obtained by inverting a phase of the first reference signal at an interval of a predetermined inversion period;

a measurement signal supply unit that produces a measurement signal, based on the second reference signal, and supplies the measurement signal to a measurement object;

a measuring unit that synchronously detects a signal occurring in the measurement object due to the measurement signal, using a modulation signal produced based on the second reference signal, and further produces a filtered signal by low-pass filtering the detected signal; and an arithmetic unit that determines impedance of the measurement object, based on an added average of a magnitude of the filtered signal when the first reference signal and the second reference signal are in phase, and a magnitude of the filtered signal when the first reference signal and the second reference signal are in anti-phase.

3. The impedance measuring device according to claim 1, wherein the inversion period is an integral multiple of a period of the measurement signal, and the arithmetic unit determines the impedance of the measurement object, based on an added average over a measurement time period that is an integral multiple of the inversion period.

4. A method comprising steps of:

generating a first reference signal, and a second reference signal that is obtained by inverting a phase of the first reference signal at an interval of a predetermined inversion period;

producing a measurement signal, based on the second reference signal, and supplying the measurement signal to a measurement object;

synchronously detecting a signal occurring in the measurement object due to the measurement signal, using a modulation signal produced based on the first reference signal, and further producing a filtered signal by low-pass filtering the detected signal; and determining impedance of the measurement object, based on an added average of a magnitude of the filtered signal when the first reference signal and the second reference signal are in phase, and a magnitude of the filtered signal with inverted sign when the first reference signal and the second reference signal are in anti-phase.

5. A method comprising steps of:

generating a first reference signal, and a second reference signal that is obtained by inverting a phase of the first reference signal at an interval of a predetermined inversion period;

producing a measurement signal based on the second reference signal, and supplying the measurement signal to a measurement object;

synchronously detecting a signal occurring in the measurement object due to the measurement signal, using a modulation signal produced based on the second reference signal, and further producing a filtered signal by low-pass filtering the detected signal; and determining impedance of the measurement object, based on an added average of a magnitude of the filtered signal when the first reference signal and the second reference signal are in phase, and a magnitude of the filtered signal when the first reference signal and the second reference signal are in anti-phase.

6. The impedance measuring device according to claim 2, wherein the inversion period is an integral multiple of a period of the measurement signal, and the arithmetic unit determines the impedance of the measurement object, based on an added average over a measurement time period that is an integral multiple of the inversion period.

* * * * *